(12) United States Patent
Su et al.

(10) Patent No.: US 12,603,364 B2
(45) Date of Patent: Apr. 14, 2026

(54) BATTERY CELL, BATTERY, ELECTRICAL DEVICE, AND MANUFACTURING METHOD AND DEVICE FOR BATTERY CELL

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Quankun Li, Ningde (CN); Kun Fang, Ningde (CN); Wenqi Zhu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 796 days.

(21) Appl. No.: 17/897,119

(22) Filed: Aug. 26, 2022

(65) Prior Publication Data

US 2023/0030940 A1 Feb. 2, 2023

Related U.S. Application Data

(63) Continuation of application No. PCT/CN2021/109914, filed on Jul. 30, 2021.

(51) Int. Cl.
*H01M 50/152* (2021.01)
*H01M 50/533* (2021.01)
*H01M 50/593* (2021.01)

(52) U.S. Cl.
CPC ....... *H01M 50/152* (2021.01); *H01M 50/533* (2021.01); *H01M 50/593* (2021.01)

(58) Field of Classification Search
CPC ............. H01M 50/533; H01M 50/593; H01M 50/147; H01M 50/166
See application file for complete search history.

(56) References Cited

U.S. PATENT DOCUMENTS

2021/0050571 A1 2/2021 Lin
2021/0257704 A1* 8/2021 Sawada ............... H01M 50/213

FOREIGN PATENT DOCUMENTS

CN 109860448 A * 6/2019 .............. H01M 2/04
CN 110233212 A * 9/2019 .......... H01M 50/107
(Continued)

OTHER PUBLICATIONS

The World Intellectual Property Organization (WIPO) International Search Report and Written Opinion for PCT/CN2021/109914 Mar. 2, 2022 17 Pages (including translation).
(Continued)

*Primary Examiner* — Karie O'Neill Apicella
(74) *Attorney, Agent, or Firm* — ANOVA LAW GROUP, PLLC

(57) ABSTRACT

A battery cell includes an electrode assembly, a housing, and an end cap. The electrode assembly includes a tab. The housing has an opening and includes a limit part, and is configured to accommodate the electrode assembly. The end cap includes a cap body and a convex part. The cap body is configured to cover the opening. In a thickness direction of the end cap, the cap body is located at one side of the limit part away from the electrode assembly. The limit part is configured to limit the cap body from moving relatively to the housing towards the electrode assembly. The convex part protrudes from an inner surface of the cap body towards the electrode assembly. The convex part is configured to go beyond the limit part away from the cap body, so that the convex part is pressed against the tab.

19 Claims, 5 Drawing Sheets

(56)                    References Cited

FOREIGN PATENT DOCUMENTS

| | | | |
|---|---|---|---|
| CN | 211182396 | U | 8/2020 |
| CN | 211295154 | U | 8/2020 |
| CN | 211700467 | U | 10/2020 |
| EP | 3680956 | A1 | 7/2020 |
| EP | 4007026 | A1 | 6/2022 |
| JP | 2012038705 | A | 2/2012 |
| JP | 2014222670 | A | 11/2014 |
| JP | 2015156375 | A | 8/2015 |
| JP | 2017059345 | A | 3/2017 |
| JP | 2020074290 | A | 5/2020 |
| WO | 2018225394 | A1 | 12/2018 |

OTHER PUBLICATIONS

The China National Intellectual Property Administration (CNIPA) Notice of Grant of Utility Model Patent Right for Application No. 202121777527.7 Dec. 1, 2021 2 pages (including translation).

The Japan Patent Office (JPO) Notification of Reasons for Refusal for Application No. 2022-549694 Oct. 3, 2023 9 Pages(including translation).

The European Patent Office (EPO) Extended European Search Report for EP 21926055.1 Apr. 5, 2023 8 pages.

* cited by examiner

BATTERY CELL, BATTERY, ELECTRICAL DEVICE, AND MANUFACTURING METHOD AND DEVICE FOR BATTERY CELL

CROSS-REFERENCE TO RELATED APPLICATION

This application is a continuation of International Application No. PCT/CN2021/109914, filed Jul. 30, 2021, the entire content of which is incorporated herein by reference.

TECHNICAL FIELD

The present application relates to the field of battery technology, and in particular, to a battery cell, a battery, an electrical device, and a manufacturing method and device for the battery cell.

BACKGROUND ART

Batteries are widely used in electronic devices, such as, mobile phones, laptops, battery cars, electric cars, electric planes, electric boats, electric toy cars, electric toy boats, electric toy planes and power tools, etc.

Generally, a battery cell comprises a housing, an electrode assembly and an end cap. The electrode assembly is accommodated in the housing. The end cap covers the opening of one end of the housing. The end cap is electrically connected to the tab, and the end cap serves as the output pole of the battery cell. For a common battery cell, due to limitation of the structure of the housing, it is possible that the end cap cannot be in contact or in poor contact with the tab, which affects normal use of the battery cell.

SUMMARY

Embodiments of the present application provide a battery cell, a battery, an electrical device, and a method and device for manufacturing the battery cell, which can ensure that the end cap in the battery cell is in good contact with the tab.

In the first aspect, an embodiment of the present application provides a battery cell, comprising: an electrode assembly, having a first tab; a housing, having an opening and a first limit part, wherein the housing is configured for accommodating the electrode assembly; and an end cap, comprising a cap body, wherein the cap body is configured to cover the opening; and in a thickness direction of the end cap, the cap body is located at one side of the first limit part away from the electrode assembly, and the first limit part is configured to limit the cap body from moving relatively to the housing towards the electrode assembly, wherein the end cap further comprises a first convex part protruding from an inner surface of the cap body towards the electrode assembly, and the first convex part is configured to go beyond the first limit part away from the cap body, so that the first convex part is pressed against the first tab.

In the above technical solution, the first convex part of the end cap exceeds the first limit part in the direction away from the cap body, so that the convex part is pressed against the first tab, so as to ensure good contact between the first convex part and the first tab, increasing the flow area between the first tab and the end cap, reducing the risk that the first tab is unable to contact the end cap due to being limited by the first limit part of the housing, and ensuring the performance of the battery.

In some embodiments, in the thickness direction, the first convex part has an abutting plane abutting against the first tab, and the abutting plane is closer to the electrode assembly, compared with the first limit part as a whole.

In the above technical solution, the abutting plane of the first convex part abuts against the first tab, thereby increasing the contact area between the first tab and the first convex part, so as to increase the flow area between the first tab and the end cap. The abutting plane is closer to the electrode assembly than the first limit part as a whole, so that the first convex part goes beyond the first limit part away from the cap body.

In some embodiments, the battery cell further comprises: a first insulation member, which is configured for isolating the cap body from the housing, so as to realize insulating connection between the cap body and the housing.

In the above technical solution, the first insulation member plays the role of isolating the cap body from the housing, so that the cap body and the housing are kept as insulated from each other.

In some embodiments, the first insulation member comprises: an insulation part, configured for isolating the cap body from the housing; and a pressing part, connected to the insulation part and configured for pressing against the first tab.

In the above technical solution, the first insulation member comprises an insulation part and a pressing part connected to the insulation part, and the insulation part isolates the cap body from the housing, so as to realize the insulating connection between the cap body and the housing. The pressing part presses against the first tab, and fulfills the effect of limiting the first tab, thereby reducing the risk that the first tab is lifted up to contact the first limit part, resulting in a short circuit between the positive and negative electrodes. That is to say, the first insulation member can limit the first tab while achieving the insulation between the cap body and the housing.

In some embodiments, in the thickness direction, the pressing part extends from the insulation part towards the tab, to press against the first tab.

In the above technical solution, the pressing part extends from the insulation part towards the tab in the thickness direction of the end cap, so that the pressing part has a better effect of pressing the first tab, and the first tab is less easy to be warped.

In some embodiments, the pressing part is located at an outer periphery of the first convex part, the first limit part is located at an outer periphery of the pressing part, and the pressing part is configured for isolating the first convex part and the first limit part.

In the above technical solution, the pressing part is located at the outer periphery of the first convex part, and the first limit part is located at the outer periphery of the pressing part, that is, the pressing part is located between the first convex part and the first limit part, so that the pressing part plays the role of isolating the first convex part and the first limit part, and reduces the risk of the first convex part coming into contact with the first limit part.

In some embodiments, the pressing part is of an annular structure.

In the above technical solution, the pressing part is of an annular structure, which can press against the entire circumference of the first tab achieving a better effect of restricting the first tab.

In some embodiments, the cap body is sealingly connected to the housing through the first insulation member.

In the above technical solution, the cap body is sealingly connected to the housing through the first insulation member, and the first insulation member fulfills both an insulating function and a sealing function between the cap body and the housing.

In some embodiments, the housing further has a second limit part; and in the thickness direction, the cap body is located at one side of the second limit part facing the electrode assembly, and the second limit part and the first limit part are configured to jointly limit the cap body from moving relatively to the housing in the thickness direction.

In the above technical solution, both the second limit part and the first limit part of the housing play a limiting role on the cap body, so as to cooperatively restrict the movement of the cap body relative to the housing along the thickness direction of the end cap. Here, the first limit part functions to limit the cap body from moving relatively to the housing towards the electrode assembly, and the second limit part functions to limit the cap body from moving relatively to the housing away from the electrode assembly.

In some embodiments, the second limit part is a flanging structure that is formed at the opening position by partially inward folding the housing.

In the above technical solution, the second limit part is a flanging structure which is formed at the opening position by partially folding the housing inward, that is to say, by folding the housing, the second limit part can be formed at the opening position of the housing and the forming is simple to be performed.

In some embodiments, the end cap further comprises a second convex part which protrudes from an outer surface of the cap body away from the electrode assembly, and an outer surface of the second convex part is flush with an outer surface of the second limit part.

In the above technical solution, the outer surface of the second convex part is flush with the outer surface of the second limit part, which is convenient for the connection of the second convex part and the bus component, and ensures that the two have a large contact area after being connected, so as to facilitate the flowing.

In some embodiments, wherein the first convex part is welded to the first tab.

In the above technical solution, the first convex part is welded to the first tab, so that the first convex part is always in good contact with the first tab. The connection between the first convex part and the first tab is realized by welding, which is realized simply.

In a second aspect, an embodiment of the present application provides A battery, comprising: the battery cell according to any one embodiment of the first aspect; and box, configured for accommodating the battery cell In a third aspect, an embodiment of the present application provides an electrical device, comprising the battery according to any one embodiment of the second aspect.

In a fourth aspect, an embodiment of the present application provides a manufacturing method for a battery cell, the manufacturing method comprising: providing an electrode assembly, with the electrode assembly having a first tab; providing a housing, wherein the housing has an opening and a first limit part; providing an end cap; making the electrode assembly accommodated in the housing; and making the end cap cover the opening, wherein the end cap comprises a cap body, the cap body is configured to cover the opening, and in the thickness direction of the end cap, the cap body is located at one side of the first limit part away from the electrode assembly, and the first limit part is configured to limit the cap body from moving relatively to the housing towards the electrode assembly; and the end cap further comprises a first convex part which protrudes from an inner surface of the cap body towards the electrode assembly, the first convex part is configured to go beyond the first limit part away from the cap body, so that the first convex part is pressed against the first tab.

In a fifth aspect, an embodiment of the present application further provides a manufacturing device for a battery cell, comprising: a first providing device, configured for providing an electrode assembly, the electrode assembly having a first tab; a second providing device, configured for providing a housing, the housing having an opening and a first limit part; a third providing device, configured for providing an end cap; and an assembling device, configured for making the electrode assembly accommodated in the housing and making the end cap cover the opening, wherein the end cap comprises a cap body, the cap body is configured to cover the opening, and in a thickness direction of the end cap, the cap body is located at one side of the first limit part away from the electrode assembly, and the first limit part is configured to limit the cap body from moving relatively to the housing towards the electrode assembly; and the end cap further comprises a first convex part which protrudes from an inner surface of the cap body towards the electrode assembly, and the first convex part is configured to go beyond the first limit part away from the cap body, so that the first convex part is pressed against the first tab.

BRIEF DESCRIPTION OF DRAWINGS

In order to illustrate the technical solutions of the embodiments of the present application more clearly, the drawings needed to be used in the embodiments will be briefly introduced below. It should be understood that the following drawings only show some of the embodiments of the present application, and therefore should be regarded as a limitation on the scope. For those skilled in the art, other related drawings can also be obtained according to these drawings without any creative efforts.

Figure 1:
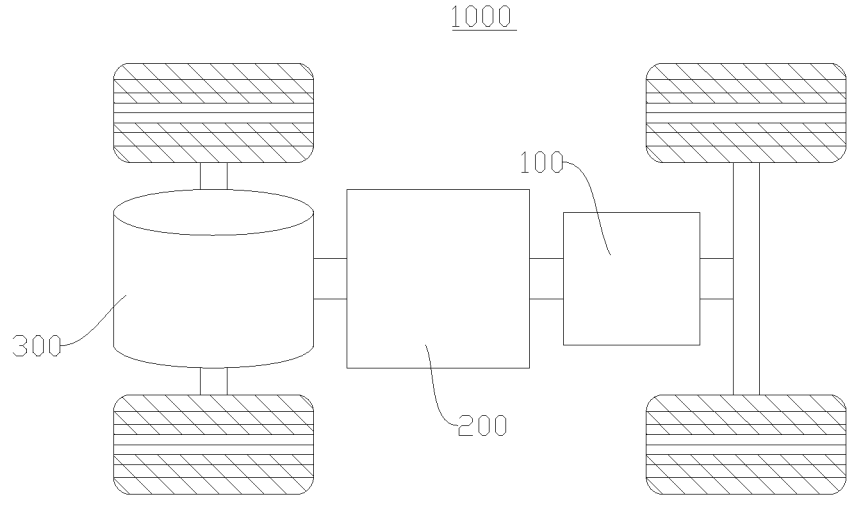
FIG. 1 is a schematic structural diagram of a vehicle provided by some embodiments of the present application.

Reference Numbers: 10—box; 11—first part; 12—second part; 13—accommodating cavity; 20—battery cell; 21—electrode assembly; 211—main body part; 212—first tab; 213—second tab; 214—central hole; 22—housing; 221—opening; 222—first limit part; 223—housing body; 2231—roller groove; 224—covering body; 225—second limit part; 23—end cap; 231—cap body; 232—first convex part; 2321—abutting plane; 233—second convex part; 234—liquid injection hole; 235—flow guiding channel; 236—concave part; 237—liquid outlet surface; 24—sealed space; 25—first insulation member; 251—insulation part; 2511—first insulation section; 2512—second insulation section; 2513—third insulation section; 252—pressing part; 26—second insulation member; 261—enclosure body; 262—covering part; 27—blocking member; 100—battery; 200—controller; 300—motor; 1000—vehicle; 2000—manufacturing device; 2100—first providing device; 2200—second providing device; 2300—third providing device; 2400—assembling device; Z-thickness direction.

DETAILED DESCRIPTION OF EMBODIMENTS

In order to make the purposes, technical solutions and advantages of the embodiments of the present application more clear, the technical solutions in the embodiments of the present application will be clearly described below with reference to the drawings in the embodiments of the present application. Obviously, some, but not all, of embodiments are described. Based on the embodiments in the present application, all other embodiments, which are obtained by those skilled in the art without creative works, fall within the protection scope of the present application.

Unless otherwise defined, all technical and scientific terms used in the present application have the same meaning as commonly understood by those skilled in the technical field of the present application. The terms used in the present application in the specification of the present application are only for the purpose of describing specific embodiments, not limiting the present application. The terms "comprising" and "comprise" and any variations thereof in the description and claims of the present application and the above drawing description are intended to cover non-exclusive inclusion. The terms "first", "second" and the like in the description and claims of the present application or the above drawings are used to distinguish different objects, rather than to describe a specific order or a primary and secondary relationship.

The "embodiment" mentioned in the present application means that a particular feature, structure, or characteristic, which is described in connection with the embodiment, can be included in at least one embodiment of the present application. The appearances of the term in various places in the specification do not necessarily refer to a same embodiment, or a separate or alternative embodiment that is mutually exclusive of other embodiments.

In the description of the present application, it should be noted that, unless expressly specified and limited otherwise, the terms, "installed", "connected to", "connected to" and "attached" should be understood in a broad sense. For example, it may be a fixed connection, or a detachable connection, or an integral connection. It can be directly connected, or indirectly connected through an intermediate medium, and it can be internally communicated between two components. For those skilled in the art, the specific meanings of the above terms in the present application can be understood according to specific situations.

In the embodiments of the present application, the same reference numeral denotes the same components. For the sake of brevity, detailed descriptions of the same components are omitted in different embodiments. It should be understood that the thickness, length, width and other dimensions of various components in the embodiments of the present application, as well as the overall thickness, length, width, and other dimensions of the integrated device are shown in the drawings, which are only exemplary descriptions, and should not constitute any limitation on the present application.

The appearance of "plurality" in the present application refers to two or more (including two).

In the present application, the battery cells may comprise lithium-ion secondary batteries, lithium-ion primary batteries, lithium-sulfur batteries, sodium-lithium-ion batteries, sodium-ion batteries, or magnesium-ion batteries, etc., which are not limited in the embodiments of the present application. The battery cell may be in the form of a cylinder, a flat body, a cuboid, or other shapes, which are not limited in the embodiments of the present application. The battery cells are generally divided into three types according to the packaging method: cylindrical battery cells, square battery cells, and soft-pack battery cells, which are not limited in the embodiments of the present application.

The battery mentioned in the embodiments of the present application refers to a single physical module including one or more battery cells to provide higher voltage and capacity. For example, the battery mentioned in the present application may comprise a battery module or a battery pack, and the like. The battery typically comprises a box for enclosing one or more battery cells. The box can prevent liquids or other foreign objects from affecting the charging or discharging of the battery cells.

The battery cell comprises an electrode assembly and electrolyte solution. The electrode assembly is composed of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer, the positive electrode active material layer is coated on the surface of the positive electrode current collector, and the positive electrode current collector not coated with the positive electrode active material layer protrudes from the positive electrode current collector coated with the positive electrode active material layer. The positive electrode current collector not coated with the positive electrode active material layer is used as the positive electrode tab. With a lithium-ion battery as an example, the material of the positive electrode current collector can be aluminum, and the positive electrode active material can be lithium cobalt oxide, lithium iron phosphate, ternary lithium, or lithium manganate, etc. The negative electrode sheet comprises a negative electrode current collector and a negative electrode active material layer, the negative electrode active material layer is coated on the surface of the negative electrode current collector, and the negative electrode current collector not coated with the negative electrode active material layer is protruded from the negative electrode collector that has been coated with the negative electrode active material layer. The negative electrode current collector not coated with the negative electrode active material layer is used as the negative electrode tab. The material of the negative electrode current collector can be copper, and the negative electrode active material can be carbon or silicon, etc. In order to ensure that large current is passed without fusing, the number of positive tabs is plural and stacked together, and the number of negative tabs is plural and stacked together. The material of the separator can be PP (polypropylene) or PE (polyethylene), and the like. In addition, the electrode assembly may be of a wound structure or a laminated structure, which is not limited in the embodiment of the present application.

For a common battery cell, the end cap needs to be electrically connected to the tab, so that the end cap can be used as the output pole (positive output pole or negative output pole) of the battery cell, and however, after the actual assembly, it is easy that the end cap cannot be in good contact with the tabs, resulting in that the battery cell fails to work normally. The inventor found that, in a battery cell, the housing generally had a limit part, and the limit part plays a role of restricting the end cap, to limit the end cap from moving towards the electrode assembly. In this situation, the tabs can also be limited by the limit part, which cause that the end cap and the tab are not be in normal contact or are in poor contact with each other, so that the battery cell cannot be used normally.

In view of this, an embodiment of the present application provides a technical solution, in which the end cap comprises a cap body and a first convex part. The cap body is used to cover the opening of the housing, and the cap body is located at one side of the first limit part away from the electrode assembly. The first convex part exceeds the first limit part in the direction away from the cap body, so that the first convex part is pressed against the first tab, so as to ensure the good contact between the first convex part and the first tab, and increase the flow area between the first tab and the end cap, reducing the risk that the first tab cannot be in contact with the end cap because the first tab is restricted by the first limit part of the housing, thereby ensuring battery performance.

The technical solutions described in the embodiments of the present application are applicable to batteries and electrical devices using batteries.

The electrical devices can be vehicles, mobile phones, portable devices, notebook computers, ships, spacecraft, electric toys and power tools, and so on. The vehicles can be fuel vehicles, gas vehicles or new energy vehicles, and the new energy vehicles can be pure electric vehicles, hybrid vehicles or extended-range vehicles, etc. The spacecraft comprise airplanes, rockets, space shuttles, spacecraft, etc. The electric toys comprise electric toys of fixed type or mobile type, such as, game consoles, electric car toys, electric ship toys and electric airplane toys, etc. The electric tools comprise metal cutting electric tools, grinding electric tools, assembling electric tools and railway electric tools, such as, electric drills, electric grinders, electric wrenches, electric screwdrivers, electric hammers, electric impact drills, concrete vibrators and electric planers, etc. The embodiments of the present application do not impose special restrictions on the above-mentioned electrical devices.

In the following embodiments, for the convenience of description, the electric device is a vehicle as an example for description.

Referring to FIG. 1, it is a schematic structural diagram of a vehicle 1000 provided by some embodiments of the present application. A battery 100 is disposed inside the vehicle 1000, and the battery 100 may be disposed at the bottom, head or tail of the vehicle 1000. The battery 100 may be used for supplying power to the vehicle 1000, and for example, the battery 100 may be used as an operating power source of the vehicle 1000.

The vehicle 1000 may also comprise a controller 200 and a motor 300 for controlling the battery 100 to supply power to the motor 300, e.g., for the work power requirements during starting, navigating, and driving the vehicle 1000.

In some embodiments of the present application, the battery 100 can be used as not only the operating power source of the vehicle 1000, but also the driving power source of the vehicle 1000, to replace or partially replace the fuel or natural gas to provide driving power for the vehicle 1000.

Figure 2:
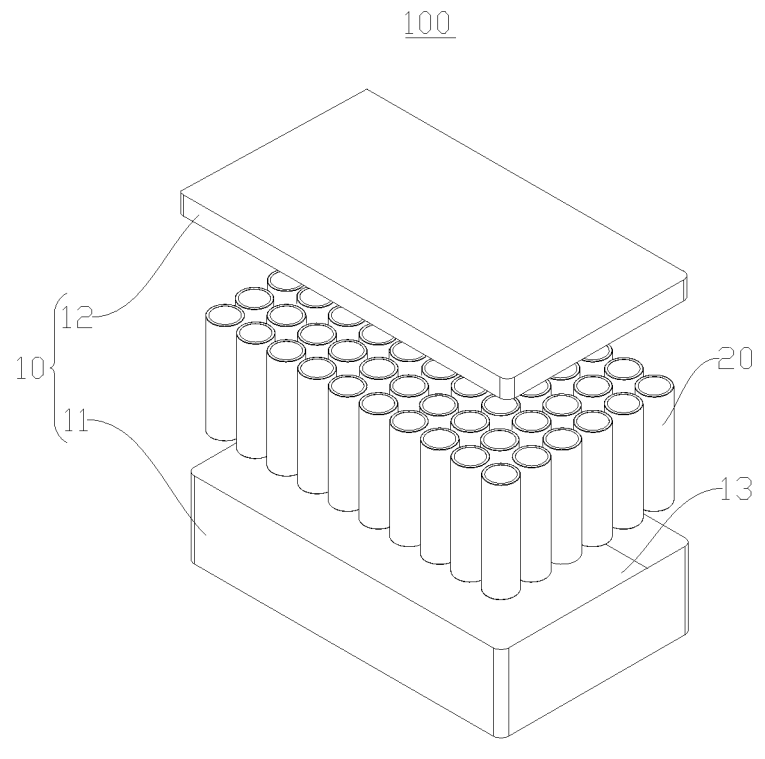
FIG. 2 is a schematic structural diagram of a battery provided by some embodiments of the present application.

In some embodiments, referring to FIG. 2, it is a schematic structural diagram of a battery 100 provided by some embodiments of the present application. The battery 100 comprises a box 10 and a battery cell 20, and the box 10 is used to accommodate the battery cell 20.

The box 10 may comprise a first part 11 and a second part 12, and the first part 11 and the second part 12 are covered with each other to define an accommodating cavity 13 for accommodating the battery cells 20. The first part 11 and the second part 12 may be of various shapes, such as a cuboid, a cylinder, and the like. The first part 11 can be a hollow structure with one side open, and the second part 12 can also be a hollow structure with one side open. The open side of the second part 12 covers the open side of the first part 11 to form the box 10 having the accommodating cavity 13. As shown in FIG. 2, it is also possible that the first part 11 is a hollow structure with one side open, the second part 12 is a plate-like structure, and the second part 12 covers the open side of the first part 11 to form the box 10 having the accommodating cavity 13. Exemplarily, in FIG. 2, the first part 11 and the second part 12 are both of the cuboid structure.

Herein, the first part 11 and the second part 12 can be sealed by a sealing element, and the sealing element can be a sealing ring, a sealant or the like.

In the battery 100, there may be one battery cell 20 or a plurality of battery cells 20. If there are a plurality of battery cells 20, the plurality of battery cells 20 may be connected in series or in parallel or in a mixed connection. The "mixed connection" means that the plurality of battery cells 20 have some connected in series and the remaining in parallel. It is possible that the plurality of battery cells 20 may be connected in series or in parallel or in mixed connection to form a battery module firstly, and then a plurality of battery modules may be connected in series or in parallel or in the mixed connection to form a whole, which is accommodated in the box 10. It is also possible that all the battery cells 20 are directly connected in series, in parallel or in a mixed connection, and then the whole formed by all the battery cells 20 is accommodated in the box 10.

In some embodiments, the battery 100 may further comprise a bus component, and the plurality of battery cells 20 may be electrically connected through the bus components, so as to realize the series, parallel or mixed connection of the plurality of battery cells 20.

The bus components may be metal conductors, such as copper, iron, aluminum, stainless steel, aluminum alloys, and the like.

Figure 3:
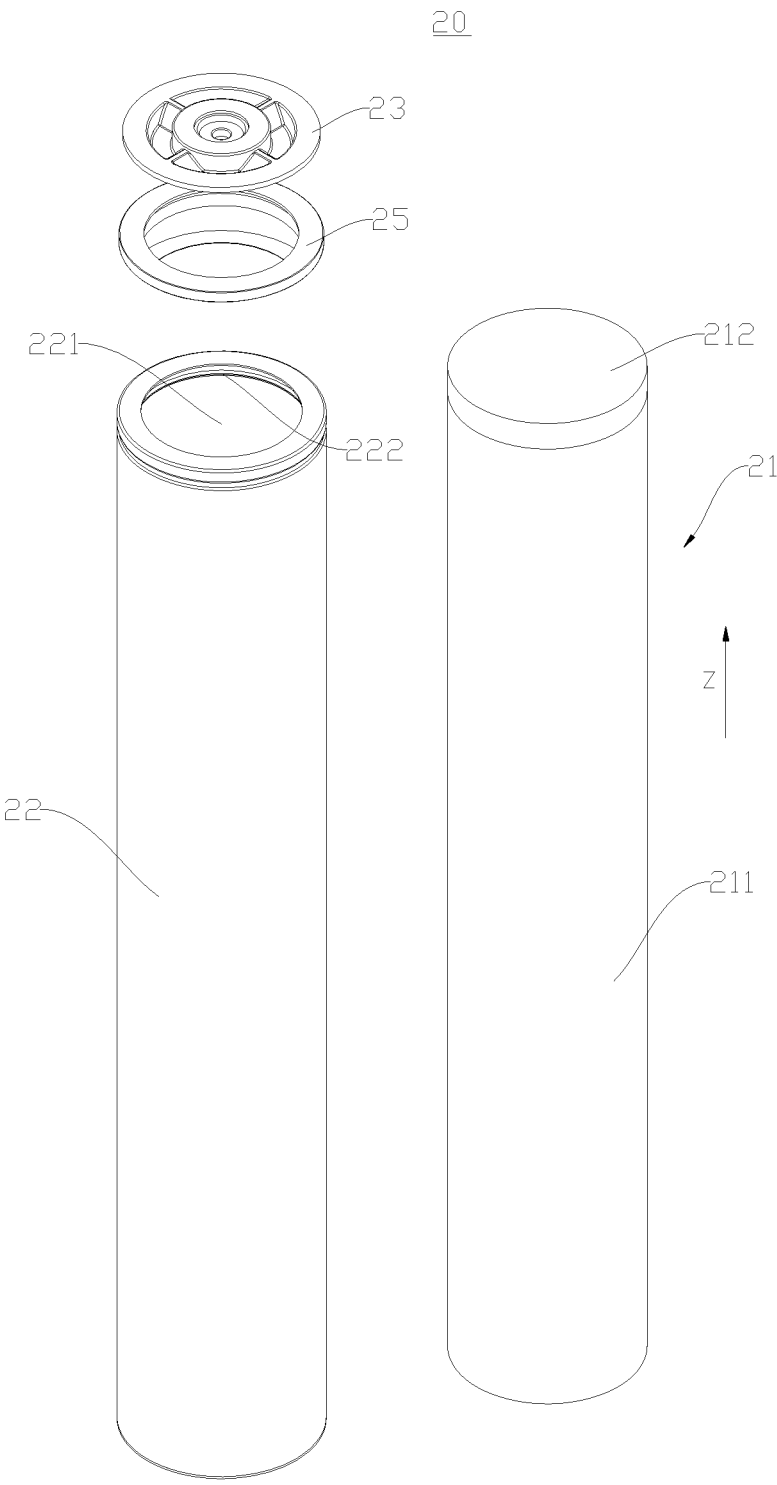
FIG. 3 is an exploded view of a battery cell provided by some embodiments of the present application.
Figure 4:
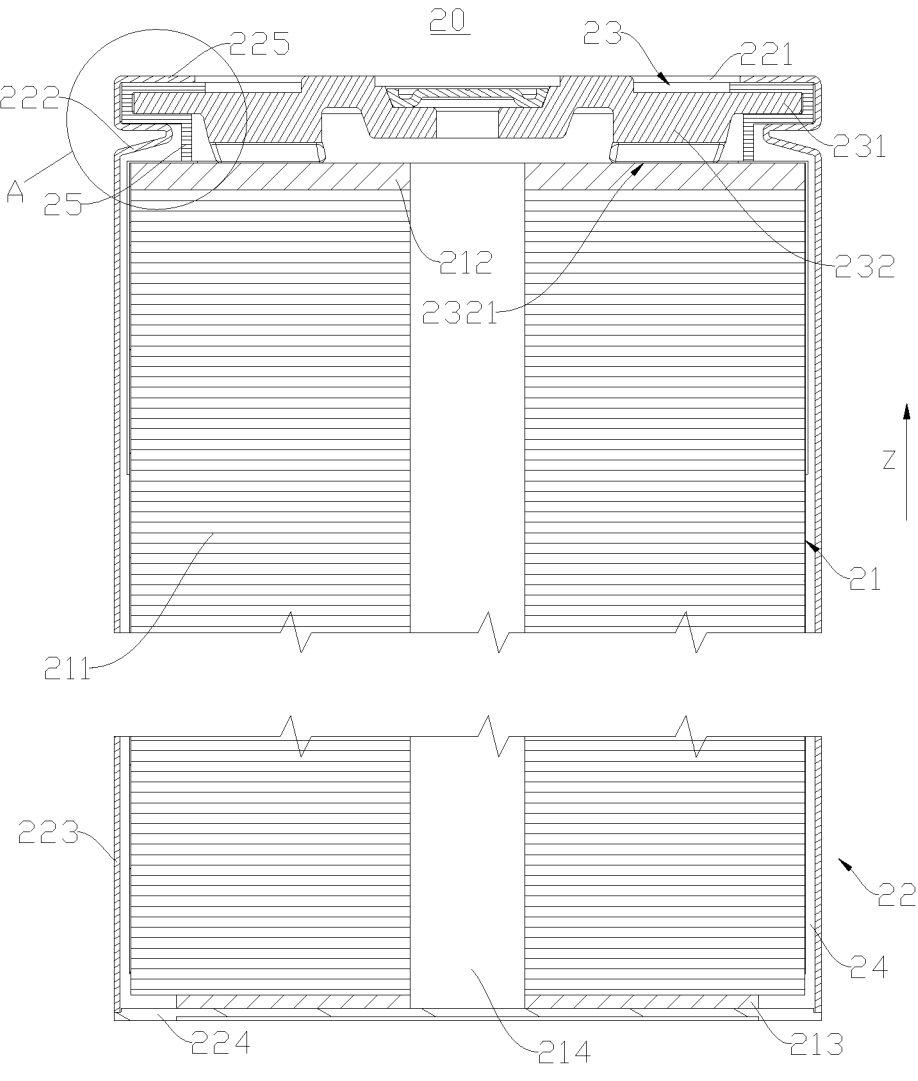
FIG. 4 is a sectional view of the battery cell shown in FIG. 3.

Referring to FIGS. 3 and 4, FIG. 3 is an exploded view of a battery cell 20 provided by some embodiments of the present application, and FIG. 4 is a sectional view of the battery cell 20 shown in FIG. 3. The battery cell 20 comprises an electrode assembly 21, a housing 22 and an end cap 23. The electrode assembly 21 has a first tab 212. The housing 22 has an opening 221 and a first limit part 222, and the housing 22 is used for accommodating the electrode assembly 21. The end cap 23 comprises a cap body 231, which is used to cover the opening 221. In the thickness direction Z of the end cap 23, the cap body 231 is located at one side of the first limit part 222 away from the electrode assembly 21. The first limit part 222 is used to limit the cap body 231 from moving relatively to the housing 22 towards the electrode assembly 21. The end cap 23 further comprises a first convex part 232 protruding from the inner surface of the cap body 231 towards the electrode assembly 21. The first convex part 232 is configured to go beyond the first limit part 222 away from the cap body 231, so that the first convex part 232 is pressed against the first tab 212.

Since the first convex part 232 of the end cap 23 goes beyond the first limit part 222 in the direction away from the cap body 231, the convex part is pressed against the first tab 212, ensuring the good contact between the first convex part 232 and the first tab 212, increasing the flow area between the first tab 212 and the end cap 23, reducing the risk that the first tab 212 cannot contact the end cap 23 due to the restriction of the first limit part 222 of the housing 22, and ensuring the performances of battery 100.

Here, the first convex part 232 is pressed against the first tab 212 to realize the electrical connection between the end cap 23 and the first tab 212. In some embodiments, the first convex part 232 can be fixedly connected to the first tab 212, and for example, the first convex part 232 is welded to the first tab 212, so that the first convex part 232 is always kept in good contact with the first tab 212. The connection between the first convex part 232 and the first tab 212 is realized by welding, such that the realization is simple.

In some embodiments, in the thickness direction Z of the end cap 23, the first convex part 232 has an abutting plane 2321 abutting against the first tab 212, so as to increase the contact area between the first tab 212 and the first convex part 232, thereby increasing the flow area between the first tab 212 and the end cap 23. The abutting plane 2321, as a whole, is closer to the electrode assembly 21 than the first limit part 222, so as to realize that the first convex part 232 goes beyond the first limit part 222 away from the cap body 231.

In the actual assembly process, after the cap body 231 of the end cap 23 covers the opening 221 of the housing 22 and the abutting plane 2321 is pressed against the first tab 212, the first convex part 232 and the first tab 212 can be welded together, outside of the end cap 23, and for example, the first convex part 232 and the first tab 212 are welded by laser welding.

In some embodiments, the electrode assembly 21 comprises a main body part 211, a first tab 212 and a second tab 213, and the first tab 212 and the second tab 213 have opposite polarities. Both the first tab 212 and the second tab 213 protrude from the main body part 211, the first tab 212 is used for being electrically connected to the end cap 23, and the second tab 213 is used for being electrically connected to the housing 22.

The first tab 212 and the second tab 213 may be disposed at opposite ends of the main body part 211, or may be disposed at the same end of the main body part 211. In FIG. 4, the first tab 212 and the second tab 213 are respectively disposed at opposite ends of the main body part 211.

The main body part 211 may comprise a positive electrode sheet, a negative electrode sheet and a separator. The main body part 211 may be a rolled structure which is formed by winding the positive electrode sheet, the separator and the negative electrode sheet. The main body part 211 may also be a laminated structure which is formed by stacking the positive electrode sheet, the separator and the negative electrode sheet.

The positive electrode sheet comprises a positive electrode current collector and a positive electrode active material layer coated on opposite sides of the positive electrode current collector. The negative electrode sheet comprises a negative electrode current collector and a negative electrode active material layer coated on opposite sides of the negative electrode current collector. The main body part 211 may be the portion of the electrode assembly 21 corresponding to the region of the electrode sheet coated with the active material layer, and the tab may be the portion of the electrode assembly 21 corresponding to the region of the electrode sheet not coated with the active material layer.

One of the first tab 212 and the second tab 213 is a positive electrode tab, and the other is a negative electrode tab. That is, if the first tab 212 is a positive electrode tab, the second tab 213 is a negative electrode tab; and if the first tab 212 is a negative electrode tab, the second tab 213 is a positive electrode tab. The positive electrode tab may be an area on the positive electrode sheet that is not coated with a positive electrode active material layer, and the negative electrode tab may be an area on the negative electrode sheet that is not coated with a negative electrode active material layer.

In the embodiment of the present application, the housing 22 is used for accommodating the electrode assembly 21. After the cap body 231 of the end cap 23 covers the opening 221 of the box 22, the end cap 23 and the housing 22 jointly form an sealing space 24, for accommodating the electrode assembly 21 and the electrolyte, which may be an electrolyte solution.

The housing 22 may be of various shapes, such as a cylinder, a cuboid, and the like. The shape of the housing 22 may be determined according to the specific shape of the electrode assembly 21. For example, if the electrode assembly 21 is of a cylindrical structure, the housing 22 can be provided as a cylindrical structure; and if the electrode assembly 21 is of a cuboid structure, the housing 22 can be provided as a cuboid structure. Exemplarily, in FIG. 4, the housing 22 is of a hollow cylindrical structure.

The housing 22 may be made of metal material, such as copper, iron, aluminum, steel, aluminum alloy, and the like.

In some embodiments, continuously referring to FIG. 4, the housing 22 may comprise a housing body 223 and a covering body 224, the housing body 223 is a hollow structure with both ends open, and the covering body 224 is connected to one end of the housing body 223, so that the housing body 223 has the other end forming an opening 221, and the cap body 231 of the end cap 23 covers the opening 221.

Exemplarily, the first tab 212 of the electrode assembly 21 is electrically connected to the end cap 23, and the second tab 213 of the electrode assembly 21 is electrically connected to the covering body 224 of the housing 22. The first tab 212 and the end cap 23, as well as the second tab 213 and the covering body 224 can be connected by welding.

The covering body 224 and the housing body 223 may be an integrally-formed structure or a separate structure. In the case where the covering body 224 and the housing body 223 are separate structures, the structures of the covering body 224 and the end cap 23 may be the same or different. The connection manner of the covering body 224 and the housing body 223 and the connection manner of the end cap 23 and the housing body 223 may be the same or different. The connection manner between the covering body 224 and the second tab 213 and the connection manner between the end cap 23 and the first tab 212 may be the same or different.

Exemplarily, in FIG. 4, the housing body 223 is of a cylindrical structure, the covering body 224 is of a plate-like structure, and the covering body 224 and the housing body 223 are of a separate structure.

In some embodiments, in the thickness direction Z of the end cap 23, the first limit part 222 of the housing 22 covers at least a part of the first tab 212, and the first limit part 222 can play a role of limiting the electrode assembly 21 from being separated from the housing 22 through the opening 221 of the housing 22.

Specifically, the first limit part 222 is formed on the housing body 223 of the housing 22. Exemplarily, the first limit part 222 may be an annular structure protruding from the inner peripheral surface of the housing body 223.

Optionally, a roller groove 2231 is formed on the outer peripheral surface of the housing body 223 at a position corresponding to the first limit part 222. In the actual molding process, the roller grooves 2231 can be formed by rolling on the outer peripheral surface of the housing body 223 by rolling, and the first limit part 222, which is internally protruded, is formed on the inner peripheral surface of the housing body 223.

It should be noted that the cap body 231 of the end cap 23 and the housing 22 may be connected in an insulating manner, or may be electrically connected. If the covering body 224 and the housing body 223 are of an integral structure, or the covering body 224 and the housing body 223 are of a separate structure, and the covering body 224 and the housing body 223 are electrically connected, then the cap body 231 and the housing body 223 of the housing 22 can be connected in insulation manner to reduce the risk of short circuit; and if the covering body 224 and the housing body 223 are of separated structures, and the covering body 224 and the housing body 223 are connected in insulation manner, and the cap body 231 and the housing body 223 of the housing 22 can be electrically connected to each other, to reduce the risk of short circuits.

Figure 5:
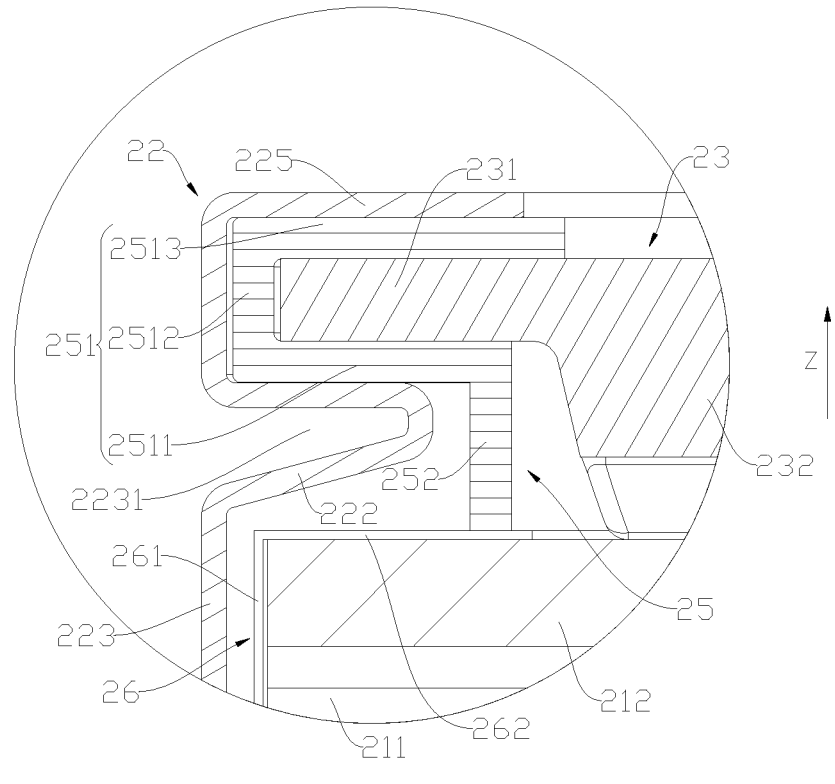
FIG. 5 is a partial enlarged view of the A of the battery cell shown in FIG. 4.

In some embodiments, referring to FIG. 5, it is a partial enlarged view of the battery cell 20 shown in FIG. 4. The battery cell 20 further comprises a first insulation member 25, and the first insulation member 25 is used for isolating the cap body 231 and the housing 22 to realize the insulating connection between the cap body 231 and the housing 22, so that the cap body 231 and the housing 22 are kept in insulation. It can be understood that the insulating connection between the cap body 231 and the housing 22 is achieved through the first insulation member 25, that is, the insulating connection between the cap body 231 and the housing body 223 of the housing 22 is achieved through the first insulation member 25.

Since the cap body 231 and the housing 22 are connected in insulation manner by the first insulation member 25, even if the housing 22 and the end cap 23 are charged with different polarities, it is unlikely that the cap body 231 and the housing 22 are in contact with each other to cause a short circuit. However, if the first tab 212 is lifted up to contact with the first limit part 222 of the housing 22, a short circuit may still occur.

In the embodiment of the present application, since the first convex part 232 of the end cap 23 goes beyond the first limit part 222 in the direction away from the cap body 231 and the first convex part 232 presses against the first tab 212, the first convex part 232 can limit the first tab 212, thereby reducing the risk of short circuit between the positive and negative electrodes due to the raised tab coming into contact with the first limit part 222.

Herein, the first insulation member 25 may be of an insulating material, such as plastic or rubber.

The end cap 23 can be used as one output pole of the battery cell 20, and the housing body 223 or the covering body 224 of the housing 22 can be used as the other output pole of the battery cell 20. The end cap 23 can be used as the positive output pole, and the housing body 223 or the covering body 224 can be used as the negative output pole; or the end cap 23 can be used as the negative output pole, and the housing body 223 or the covering body 224 can be used as the positive output pole. The positive output pole and the negative output pole are parts of the battery cell 20 used for connecting with other components and outputting the electric energy of the battery cell 20. As an example in which two battery cells 20 are electrically connected through a bus component to realize the series connection of two battery cells 20, the positive output pole of one battery cell 20 and the negative output pole of the other battery cell 20 are both welded with the same bus component.

In some embodiments, the cap body 231 is sealingly connected to the housing 22 through the first insulation member 25, that is, the first insulation member 25 plays both an insulating function and a sealing function between the cap body 231 and the housing 22.

In some embodiments, the first insulation member 25 comprises an insulation part 251 and a pressing part 252. The insulation part 251 is used for isolating the cap body 231 and the housing 22 to realize the insulating connection between the cap body 231 and the housing 22. The pressing part 252 is connected to the insulation part 251, and the pressing part 252 is used for pressing against the first tab 212. The pressing part 252 restricts the first tab 212 and reduces the risk that the first tab 212 is lifted up to contact the first limit part 222 to cause a short circuit between the positive and negative electrodes. That is to say, the first insulation member 25 can limit the first tab 212 while achieving the insulation between the cap body 231 and the housing 22.

Exemplarily, the cap body 231 is sealingly connected to the housing 22 through the insulation part 251 of the first insulation member 25.

In some embodiments, the insulation part 251 may comprise a first insulation section 2511, a second insulation section 2512 and a third insulation section 2513. The pressing part 252, the first insulation section 2511, the second insulation section 2512 and the third insulation section 2513 are connected in sequence. The first insulation section 2511 and the third insulation section 2513 are respectively located at both sides of the cap body 231 in the thickness direction Z of the end cap 23. The cap body 231 abuts against the first limit part 222 through the first insulation section 2511, so that the first limit part 222 restricts the cap body 231, to limit the cap body 231 from moving towards the electrode assembly 21. The second insulation section 2512 is located between the inner peripheral surface of the housing 22 and the outer peripheral surface of the cap body 231. The insulation part 251 of this structure can play both the good insulating role and the good sealing role between the cap body 231 and the housing 22.

Exemplarily, the first insulation section 2511, the second insulation section 2512 and the third insulation section 2513 are all annular structures extending along the circumferential direction of the cap body 231.

In some embodiments, in the thickness direction Z of the end cap 23, the pressing part 252 extends from the insulation part 251 towards the tab, so that the pressing part 252 presses against the first tab 212. This structure enables the pressing part 252 to exert a better pressing effect on the first tab 212, and the first tab 212 is less likely to be lifted.

Exemplarily, in the thickness direction Z of the end cap 23, the pressing part 252 extends from the first insulation section 2511 of the insulation part 251 towards the first tab 212.

In some embodiments, the pressing part 252 is located at the outer periphery of the first convex part 232, the first limit part 222 is located at the outer periphery of the pressing part 252, and the pressing part 252 is used to isolate the first convex part 232 from the first limit part 222.

That is to say, the pressing part 252 is located between the first convex part 232 and the first limit part 222, so that the pressing part 252 plays a role of isolating the first convex part 232 and the first limit part 222 and reduces the risk that the convex part 232 is in contact with the first limit part 222 to cause a short circuit.

In some embodiments, the pressing part 252 is an annular structure. The pressing part 252 of this structure can press against the first tab 212 over the entire circumference, which can better restrict the first tab 212.

Exemplarily, the pressing part 252 is an annular structure surrounding the outer periphery of the first convex part 232. The pressing part 252 of this structure can completely isolate the first convex part 232 from the first limit part 222.

In the embodiment of the present application, the pressing part 252 is pressed against the first tab 212, wherein the pressing part 252 may be directly pressed against the first tab 212, or the pressing part 252 may be indirectly pressed against the first tab 212.

In some embodiments, the battery cell 20 further comprises a second insulation member 26 for isolating the first tab 212 and the first limit part 222. In the thickness direction Z of the end cap 23, the second insulation member 26 covers a part of the first tab 212, and the pressing part 252 is pressed against the first tab 212 by the portion of the first insulation member 25 covering the first tab 212. It can be understood that the pressing part 252 is pressed against the second insulation member 26 towards the electrode assembly 21, which can also prevent the second insulation member 26 from being lifted.

The second insulation member 26 may be of an insulating material, such as plastic, rubber, or the like.

Exemplarily, the second insulation member 26 comprises a surrounding body 261 and a covering part 262. The surrounding body 261 is surroundingly provided on the outer periphery of the main body part 211 of the electrode assembly 21, and the covering part 262 is connected to one end of the surrounding body 261 in the thickness direction Z of the end cap 23. In the thickness direction Z of the end cap 23, the covering part 262 covers a part of the first tab 212, and the pressing part 252 presses against the first tab 212 through the covering part 262.

In some embodiments, continuously referring to FIG. 5, the housing 22 further has a second limit part 225. In the thickness direction Z, the cap body 231 is located at one side of the second limit part 225 facing the electrode assembly 21. The second limit part 225 and the first limit part 222 are used to jointly limit the movement of the cap body 231 relative to the housing 22 along the thickness direction Z.

Here, the first limit part 222 serves to limit the movement of the cap body 231 relative to the housing 22 towards the electrode assembly 21, and the second limit part 225 serves to limit the movement of the cap body 231 relative to the housing 22 away from the electrode assembly 21.

Optionally, the second limit part 225 is a flanging structure which is formed at the position of the opening 221 by partially inward folding the housing 22. That is to say, by folding the housing 22, the second limit part 225 can be formed at the position of the opening 221 of the housing 22, and the forming is simple. In the process of assembling the battery cell 20, the electrode assembly 21 can be accommodated in the housing 22 first, and then the end cap 23 covers the opening 221 of the housing 22, and finally the housing 22 is folded to form the second limit part 225, so as to limit the position of the end cap 23.

Specifically, the second limit part 225 is a flanging structure which is formed at the position of the opening 221 by partially inward folding the housing body 223 of the housing 22.

Exemplarily, the second limit part 225 is of an annular structure.

In some embodiments, as shown in FIG. 5, when the cap body 231 and the housing 22 are insulated through the first insulation member 25, the second limit part 225 can be pressed against the cap body 231 through the third insulation section 2513, such that the third insulation section 2513 is located between the inner surface of the second limit part 225 and the outer surface of the cap body 231 in the thickness direction Z of the end cap 23.

In other embodiments, if the cap body 231 is electrically connected to the housing 22, the first limit part 222 and the second limit part 225 may directly abut against the inner surface and the outer surface of the cap body 231, respectively. In this case, the housing body 223 of the housing 22 may be connected to the covering body 224 in an insulating manner.

Figure 6:
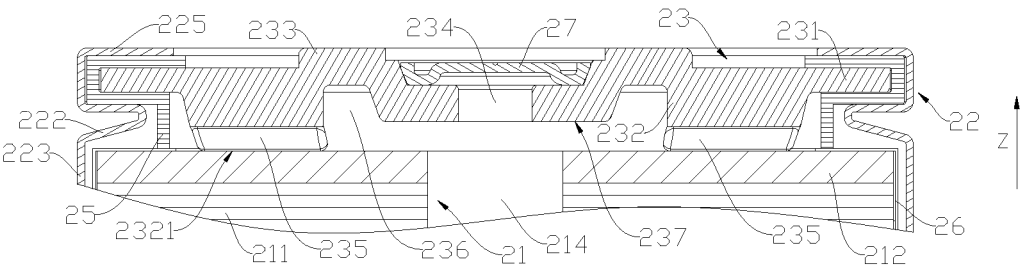
FIG. 6 is a partial view of the battery cell shown in FIG. 4.

In some embodiments, referring to FIG. 6, it is a partial view of the battery cell 20 shown in FIG. 4. The end cap 23 further comprises a second convex part 233 protruding from the outer surface of the cap body 231 away from the electrode assembly 21. The outer surface of the second convex 233 is flush with the outer surface of the second limit part 225, which facilitates the connection of the second convex part 233 and the bus component, and ensures that the two have a large contact area after being connected, for facilitating the flowing (overcurrent).

Exemplarily, the second limit part 225 is arranged around the outer periphery of the second convex part 233.

In some embodiments, the second limit part 225 and the second convex part 233 are respectively two output poles of the battery cell 20. The second convex part 233 may be used as a positive output pole, and the second limit part 225 may be used as a negative output pole. Alternatively, the second convex part 233 may be used as the negative output pole, and the second limit part 225 may be used as the positive output pole. As an example in which two battery cells 20 are electrically connected through the bus components to realize the series connection of the two battery cells 20, the second limit part 225 of one battery cell 20 and the second convex part 233 of the other battery cell 20 are both welded to the same bus component.

Since the outer surface of the second convex part 233 is flush with the outer surface of the second limit part 225, it is ensured that after the outer surface of the second convex part 233 is connected to a bus component, the outer surface of the second limit part 225 can be connected to another bus component.

In some embodiments, continuously referring to FIG. 6, the end cap 23 is provided with a liquid injection hole 234, and the electrolyte solution can be injected into the battery cell 20 through the liquid injection hole 234. The outer peripheral surface of the first convex part 232 is located at the outer periphery of the liquid injection hole 234. The first convex part 232 is provided with a flow guiding channel 235, and the flow guiding channel 235 is used for allowing the electrolyte solution to flow outside the outer peripheral surface of the first convex part 232.

When the electrolyte solution is injected into the battery cell 20 through the injection hole 234, the electrolyte solution can flow laterally from the flow guiding channel 235 and finally flow out of the outer peripheral surface of the first convex part 232, thereby improving the injection efficiency and achieving the liquid injection of high efficiency, and therefore the electrolyte solution can more easily infiltrate the electrode sheets in the electrode assembly 21.

Exemplarily, the liquid injection hole 234 is disposed coaxially with the outer peripheral surface of the first convex part 232.

The number of the flow guiding channels 235 on the first convex part 232 may be one or plural. If there are a plurality of flow guiding channels 235, the plurality of flow guiding channels 235 may be distributed circumferentially on the first convex part 232 at intervals, with the liquid injection hole 234 as the center.

In some embodiments, the electrode assembly 21 has a central hole 214. In the thickness direction Z of the end cap 23, the flow guiding channel 235 is provided coaxially with the central hole 214, so that the electrolyte solution entering the liquid injection hole 234 can directly enter the interior of the central hole 214 to wet the electrode sheets in the electrode assembly 21.

In some embodiments, the end cap 23 is provided with a concave part 236, and the concave part 236 is recessed from one end of the first convex part 232 abutting against the first tab 212, away from the electrode assembly 21. Both ends of the flow guiding channel 235 penetrate through the inner peripheral surface of the concave part 236 and the outer peripheral surface of the first convex part 232 respectively. The end cap 23 has a liquid outlet surface 237 located in the concave part 236, and the bottom end of the liquid injection hole 234 penetrates the liquid outlet surface 237. In the thickness direction Z of the end cap 23, the liquid outlet surface 237 is further away from the electrode assembly 21 than the abutting plane 2321 of the first convex part 232, so that there is a distance between the liquid outlet surface 237 and the first tab 212 in the thickness direction Z of the end cap 23. This structure allows the electrolyte solution to first enter the battery cell 20 through the liquid injection hole 234, and then enters the concave portion 236, and then enters the flow guiding channel 235, so that the electrolyte solution can flow laterally to the outside of the outer peripheral surface of the first convex portion 232.

Exemplarily, the flow guiding channel 235 is a groove, which is provided at the abutting plane 2321 and passes through the inner peripheral surface of the concave part 236 and the outer peripheral surface of the first convex part 232.

In some embodiments, the battery cell 20 further comprises a blocking member 27, and the blocking member 27 is used to block the liquid injection hole 234. After the liquid has been injected into the battery cell 20 through the liquid injection hole 234, the liquid injection hole 234 may be blocked by the blocking member 27.

Figure 7:
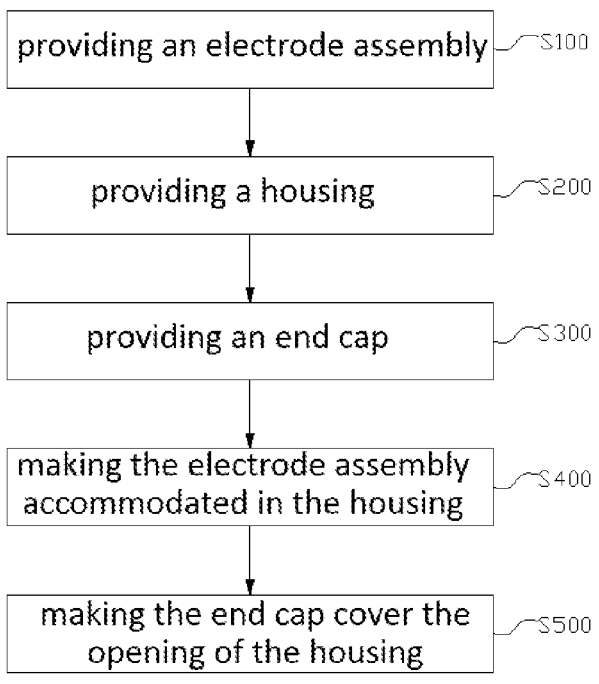
FIG. 7 is a flowchart of a method for manufacturing a battery cell provided by some embodiments of the present application.

An embodiment of the present application provides a method for manufacturing a battery cell 20. Referring to FIG. 7, FIG. 7 is a flowchart of a method for manufacturing the battery cell 20 provided by some embodiments of the present application. The manufacturing method comprises:

S100: providing an electrode assembly 21, the electrode assembly 21 having a first tab 212;

S200: providing a housing 22, the housing 22 having an opening 221 and a first limit part 222;

S300: providing an end cap 23;

S400: making the electrode assembly 21 accommodated in the housing 22;

S500: making the end cap 23 cover the opening 221 of the housing 22.

Here, the end cap 23 comprises a cap body 231, which is used to cover the opening 221. In the thickness direction Z of the end cap 23, the cap body 231 is located at one side of the first limit part 222 away from the electrode assembly 21. The first limit part 222 is used to limit the movement of the cap body 231 relative to the housing 22 towards the electrode assembly 21. The end cap 23 further comprises a first convex part 232, which protrudes from the inner surface of the cap body 231 towards the electrode assembly 21. The first convex part 232 is configured to go beyond the first limit part 222 away from the cap body 231, so that the first convex part 232 is pressed against the first tab 212.

In the above method, the sequence of step S100, step S200 and step S300 is not limited. For example, step S300 may be performed first, then step S200 may be performed, and then step S100 may be performed.

It should be noted that, the battery cells 20 provided in the foregoing embodiments may be referred to, for obtaining the related structure of the battery cell 20 manufactured by the manufacturing method provided in the foregoing embodiments, which is not described in detail herein again.

Figure 8:
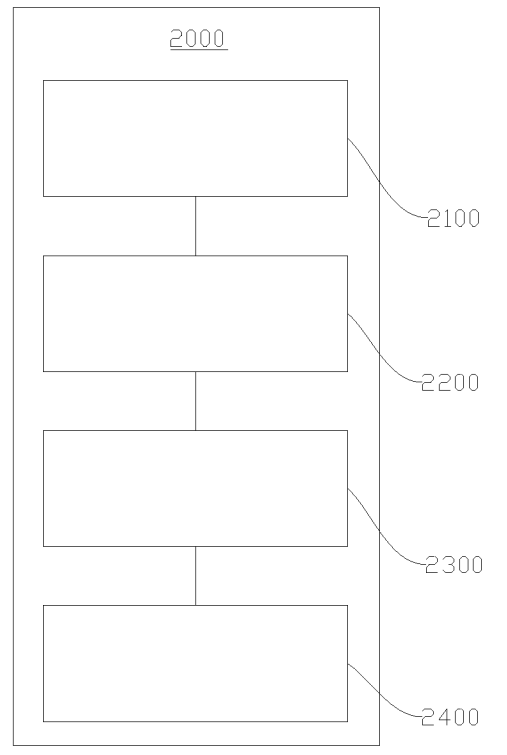
FIG. 8 is a schematic block diagram of a device for manufacturing a battery cell provided by some embodiments of the present application.

In addition, an embodiment of the present application further provides a manufacturing device 2000 for a battery cell 20. Referring to FIG. 8, FIG. 8 is a schematic block diagram of a manufacturing device 2000 for a battery cell 20 provided by some embodiments of the present application. The manufacturing device 2000 comprises a first providing device 2100, a second providing device 2200, a third providing device 2300 and an assembling device 2400.

The first providing device 2100 is used to provide the electrode assembly 21, and the electrode assembly 21 has a first tab 212. The second providing device 2200 is used to provide the housing 22, and the housing 22 has an opening 221 and a first limit part 222. The third providing device 2300 is used to provide the end cap 23. The assembly device 2400 is used for making the electrode assembly 21 accommodated in the housing 22 and for making the end cap 23 cover the opening 221.

Here, the end cap 23 comprises a cap body 231, which is used to cover the opening 221. In the thickness direction Z of the end cap 23, the cap body 231 is located at one side of the first limit part 222 away from the electrode assembly 21. The first limit part 222 is used to limit the movement of the cap body 231 relative to the housing 22 towards the electrode assembly 21. The end cap 23 further comprises a first convex part 232 protruding from the inner surface of the cap body 231 towards the electrode assembly 21. The first convex part 232 is configured to go beyond the first limit part 222 away from the cap body 231, so that the first convex part 232 is pressed against the first tab 212.

It should be noted that, the battery cell 20 provided in the foregoing embodiments may be referred to, for obtaining the related structure of the battery cell 20 manufactured by the manufacturing device 2000 provided in the foregoing embodiment, which is not described in detail herein again.

It should be noted that the embodiments in the present application and the features of the embodiments may be combined with each other if no conflict.

The above embodiments are only used to illustrate the technical solutions of the present application, and not intended to limit the present application. For those skilled in the art, the present application may have various modifications and changes. Any modifications, equivalent replacements, improvements, etc., made within the spirit and principle of the present application, shall be covered the protection scope of the present application.

What is claimed is:

1. A battery cell, comprising:

an electrode assembly, comprising a tab;

a housing, having an opening and comprising a limit part, wherein the housing is configured to accommodate the electrode assembly; and an end cap, comprising:

a cap body, wherein:

the cap body is configured to cover the opening;

in a thickness direction of the end cap, the cap body abuts against the limit part at one side of the limit part away from the electrode assembly; and the limit part is configured to limit the cap body from moving relatively to the housing towards the electrode assembly; and a convex part protruding from an inner surface of the cap body towards the electrode assembly, the convex part being configured to go beyond the limit part away from the cap body, so that the convex part is pressed against the tab, and the convex part being provided with a flow guiding channel configured to guide electrolyte solution laterally to an outer peripheral surface of the convex part.

2. The battery cell according to claim 1, wherein, in the thickness direction, the convex part has an abutting plane abutting against the tab, and the abutting plane is closer to the electrode assembly, compared with the limit part as a whole.

3. The battery cell according to claim 1, further comprising:

an insulation member, configured to isolate the cap body from the housing, so as to realize insulating connection between the cap body and the housing.

4. The battery cell according to claim 3, wherein the insulation member comprises:

an insulation part, configured to isolate the cap body from the housing; and a pressing part, connected to the insulation part and configured to press against the tab.

5. The battery cell according to claim 4, wherein, in the thickness direction, the pressing part extends from the insulation part towards the tab, to press against the tab.

6. The battery cell according to claim 4, wherein the pressing part is located at an outer periphery of the convex part, the limit part is located at an outer periphery of the pressing part, and the pressing part is configured to isolate the convex part and the limit part.

7. The battery cell according to claim 4, wherein the pressing part is of an annular structure.

8. The battery cell according to claim 3, wherein the cap body is sealingly connected to the housing through the insulation member.

9. The battery cell according to claim 1, wherein:

the limit part is a first limit part;

the housing further comprises a second limit part; and in the thickness direction, the cap body is located at one side of the second limit part facing the electrode assembly, and the second limit part and the first limit part are configured to jointly limit the cap body from moving relatively to the housing in the thickness direction.

10. The battery cell according to claim 9, wherein the second limit part has a flanging structure that is formed at a position of the opening by a portion of the housing folding inward.

11. The battery cell according to claim 10, wherein:

the convex part is a first convex part; and the end cap further comprises a second convex part protruding from an outer surface of the cap body away from the electrode assembly, and an outer surface of the second convex part is flush with an outer surface of the second limit part.

12. The battery cell according to claim 9, wherein:

the convex part is a first convex part; and the end cap further comprises a second convex part protruding from an outer surface of the cap body away from the electrode assembly, and an outer surface of the second convex part is flush with an outer surface of the second limit part.

13. The battery cell according to claim 1, wherein the convex part is welded to the tab.

14. A battery, comprising:

the battery cell according to claim 1; and a box, configured to accommodate the battery cell.

15. The battery according to claim 14, wherein, in the thickness direction, the convex part has an abutting plane abutting against the tab, and the abutting plane is closer to the electrode assembly, compared with the limit part as a whole.

16. The battery according to claim 14, wherein the battery cell further comprises:

an insulation member, configured to isolate the cap body from the housing, so as to realize insulating connection between the cap body and the housing.

17. An electrical device, comprising the battery according to claim 14.

18. A battery cell, comprising:

an electrode assembly, comprising a tab;

a housing, having an opening and comprising a limit part, wherein the housing is configured to accommodate the electrode assembly; and an end cap, comprising:

a cap body, wherein:

the cap body is configured to cover the opening;

in a thickness direction of the end cap, the cap body is located at one side of the limit part away from the electrode assembly; and the limit part is configured to limit the cap body from moving relatively to the housing towards the electrode assembly; and a convex part protruding from an inner surface of the cap body towards the electrode assembly, the convex part being configured to go beyond the limit part away from the cap body, so that the convex part is pressed against the tab;

wherein the limit part is configured to cover at least a portion of the tab in a thickness direction of the end cap.

19. A battery cell, comprising:

an electrode assembly, comprising a tab;

a housing, having an opening and comprising a limit part, wherein the housing is configured to accommodate the electrode assembly;

an end cap, comprising:

a cap body, wherein:

the cap body is configured to cover the opening;

in a thickness direction of the end cap, the cap body is located at one side of the limit part away from the electrode assembly; and the limit part is configured to limit the cap body from moving relatively to the housing towards the electrode assembly; and a convex part protruding from an inner surface of the cap body towards the electrode assembly, the convex part being configured to go beyond the limit part away from the cap body, so that the convex part is pressed against the tab; and an insulation member, comprising:

an insulation part configured to isolate the cap body from the housing; and a pressing part connected to the insulation part and
  configured to extend from the insulation part towards
  the tab to press against a top surface of the tab.

* * * * *